United States Patent [19]

Knebel et al.

[11] Patent Number: 4,990,588
[45] Date of Patent: Feb. 5, 1991

[54] TEMPERATURE RESISTANT AROMATIC POLYETHERS

[75] Inventors: Joachim Knebel; Werner Ude; Joachim Vetter, all of Darmstadt, Fed. Rep. of Germany

[73] Assignee: Röhm GmbH, Darmstadt, Fed. Rep. of Germany

[21] Appl. No.: 308,110

[22] Filed: Feb. 8, 1989

[30] Foreign Application Priority Data

Feb. 18, 1988 [DE] Fed. Rep. of Germany ....... 3804988

[51] Int. Cl.$^5$ .................. C08G 8/02; C08G 79/02
[52] U.S. Cl. .................... 528/125; 528/125; 528/167; 528/169; 528/398
[58] Field of Search ............. 528/167, 169, 398, 125

[56] References Cited

U.S. PATENT DOCUMENTS

| | | | |
|---|---|---|---|
| 4,175,175 | 11/1979 | Johnson et al. | 520/125 |
| 4,492,805 | 1/1985 | Besecke et al. | 568/12 |
| 4,696,993 | 9/1987 | Ude et al. | 528/167 |
| 4,745,225 | 5/1988 | Ude et al. | 568/15 |
| 4,748,227 | 5/1988 | Matzner et al. | 528/126 |
| 4,774,314 | 9/1988 | Winslow et al. | 528/126 |
| 4,889,909 | 12/1989 | Besecke et al. | 528/126 |

FOREIGN PATENT DOCUMENTS

| | | |
|---|---|---|
| 0244167 | 11/1987 | European Pat. Off. . |
| 3203186 | 8/1983 | Fed. Rep. of Germany . |
| 3521123 | 12/1986 | Fed. Rep. of Germany . |
| 3521124 | 12/1986 | Fed. Rep. of Germany . |
| 3725058 | 2/1989 | Fed. Rep. of Germany . |

OTHER PUBLICATIONS

Ullmanns Enzyklopädie der Technischen Chemie, 4th Edition, vol. 15, pp. 429–431, 434, 435.
Vinogradova et al. Polymer Science USSR, vol. 14 (1972) pp. 2962–2970.
Bunn et al., Rec. Trav. Chim. 87 (6), pp. 599–608 (1986).
Jennings et al., J. Polymer Sci., Part C., No. 16, pp. 715–724, (1967).

*Primary Examiner*—John Kight, III
*Assistant Examiner*—P. Hampton-Hightower
*Attorney, Agent, or Firm*—Curtis, Morris & Safford

[57] ABSTRACT

What are disclosed are aromatic polyethers which are resistant to high temperature, having a reduced viscosity greater than 0.25 dl/g and a repeating structural unit

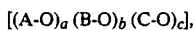

wherein A is 5a,10b-diphenyl-coumarano[2',3',2,3-]coumaran of the formula

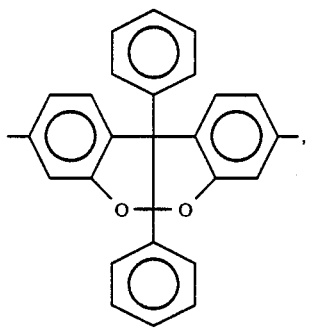

B has the formula

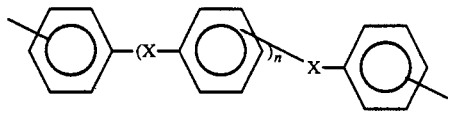

wherein n is 0 or 1, and X is

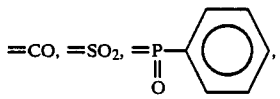

and/or

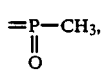

and C is at least one further aromatic unit.

4 Claims, No Drawings

TEMPERATURE RESISTANT AROMATIC POLYETHERS

The present invention relates to aromatic polyther having high glass transition temperatures and high decomposition temperatures and which constitute difficultly combustible and thermoplastically processable masses, and to methods for making the same.

Some aromatic polyethers with plastics properties h long been part of the prior art and have also gained economic importance as commercial products Properties which the aromatic polyethers have in common and which are of advantage in many end uses are their softening point, which is above 150° C., and their thermoplastic processability.

Apart from polymers such as polyxylenol, which is known in the market as PPO and is made up of alternating aromatic and ether-oxygen units in the polymer chain, the aromatic polyethers include polymers which in addition to the characteristic aromatic and oxygen units contain further characteristics groups of atoms in the polymer molecule.

Well known among these are the aeomatic polyethersulfones, also known as polyarylsulfones, which are on the market as commercial products. (See Ullmanns Enzyklopädie der technischen Chemie, 4th ed., vol. 15, pp. 429–431 and 434–435.)

From U.S. Pat. No. 4,492,805, aromatic polyethers with phosphorus-containing structural units such as triphenylphosphine oxide units in the polymer chain are known which have proved themselves as difficultly combustible or noncombustible plastics.

Aromatic polyethers can generally be produced by polycondensation of the chemical units. For example, the phosphorus-containing polyarylene ethers of U.S. Pat. No. 4,492,805 are obtained by polycondensation of a bifunctional phosphine or phosphine oxide, and particularly of the corresponding dihalogen compound, with a further bifunctional aromatic compound, and especially a bis-hydroxy compound.

Accordingly, and as described also in U.S. Pat. No. 4,175,175, the chemical units for the polycondensation are preferably symmetrical compounds of the type

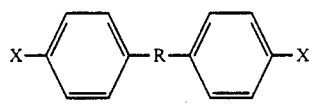 (I)

wherein R is $SO_2$, CO,

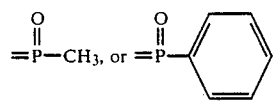

and X is F or Cl, and symmetrical compounds of the type

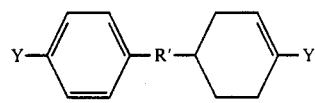 (II)

wherein R' is a covalent single bond, O, or

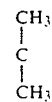

and Y is OH.

However, chemical units suitable for the production of aromatic polyethers also include compounds of types (I) and (II) wherein half or all of the reactive groups X and Y, respectively, are replaced with Y and X, respectively.

Polymer Science USSR, 14 (1972), 2962–2970, describes aromatic polyethers of the cardo type. These are prepared by polycondensation of type (I) dihalogen compounds wherein R is $SO_2$ or CO with type (II) bisphenols wherein R' is a cyclic organic group of which one carbon atom is the link between the two aromatic rings of type (II) compounds. After the polycondensation, this quaternary carbon atom forms part of the polymeric main chain. Such bisphenols thus include phenolphthalein and phenolfluorene (9,9-bis(4-hydroxyphenyl)fluorene), for example.

Phosphorus-containing polyarylene ethers which are built up like those of U.S. Pat. No. 4,492,805 but incorporate cardo units, including 5a,10b-diphenylcoumarano[2',3':2,3]coumaran units linked in etherlike fashion in the 3,8 position, in addition to the phosphorus units, are described in U.S. Pat. No. 4,696,993. Because of their relatively high water-absorption capacity and their high smoke generation in a fire, the phosphorus-containing polyethers still do not exhibit a satisfactory profile of properties.

Thus there has been a need to develop aromatic polyethers with 5a,10b-diphenylcoumarano[2',3':2,3]coumaran units linked in etherlike fashion in the 3,8 position which are amorphous, can be processed as plastics, are stable, have high glass-transition temperatures Tg, and differ from aromatic polyethers with phosphine oxide-coumaran structural units in that they exhibit significantly lower water absorption and an improved behavior in a fire environment.

It has been found that- by replacing the phosphine oxide unit in the known phosphine oxide-coumaran polyether completely or even partially with other aromatic units, such as the benzophenone or diphenylsulfone unit, which are capable of being incorporated with monomers of the aforesaid type (I), for example, and- in which still other aromatic units can be incorporated, for example, through monomers of the aforesaid type (II), aromatic polymers are obtained which in addition to the known good properties possess the further advantageous properties outlined above.

The invention thus relates to high-temperature-resistant aromatic polyethers with a reduced viscosity of over 0.25 dl/g, as measured in chloroform in conformity with DIN 7745, part 2 corresponding to ISO 1628/6, and with 5a,10b-diphenylcoumarano[2',3':2,3-]coumaran units A, linked in etherlike fashion in the position, of the repeating structural unit $$[(A-O)_a(B-O)_b(C-O)_c] \qquad (1)$$

wherein the unit A has the structural formula

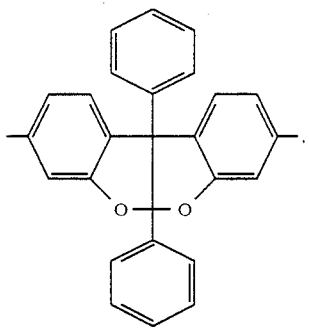

the unit B has the structural formula

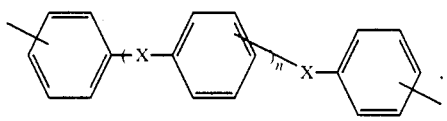

wherein n is 0 or 1 and X is CO and/or $SO_2$ and/or

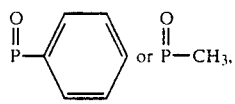

and the unit C correspond to one or more further aromatic units which are bound into the structural unit of the polymer chain and in which the aromatic elements may be connected to one another through further groups, for example, oxygen or alkylene groups, the molar ratios of the units (A+C) and B being $(a+c):b = 1:1$ to $1:100$, the molar ratios when X is CO and/or $SO_2$, and/or phosphine oxide representing up to 99 mole percent of the sum or the molar proportions of the carbonyl, sulfone and phosphine oxide groups in the structural unit 1 being $a:c = 100:0$ to $1:99$, and the molar ratios when X represents only phosphine oxide groups being $a:c = 99:1$ to $1:99$.

The invention thus also relates to polyethers with the structural unit (1) whose proportion of phosphine oxide groups in the B units represents not more than 90 mole percent, and preferably not more than 50 mole percent, of the sum of the molar proportions of the carbonyl, sulfone and phosphine oxide groups, and in particular to such polyethers that are free of phosphine oxide. When the polyethers contain only B units with phosphine oxide groups, the molar proportions of A and C therein are preferably $a:c = 90:10$ to $10:90$.

Of the ratios of (a+c):b of 1:1 to 1:100, the ratio of 1:1 is optimum.

In the polyethers of the invention, the units A, B and C which are connected together through ether-oxygen bridges may be linked in either a regular or a random sequence.

An example of an outstanding inventive polyether consists of coumaran units (A), 4,4'-benzophenone units (B),and 2,2-bis-(1,4-phenylene)propane units (C) in the molar ratios $(a+c):b = 1:1$, with $a:c = 30:70$ to $100:0$, and particularly with $a:c = 30:70$ to $90:10$.

Compared to prior-art polyethers, including those of the cardo type, the novel thermoplastically processable polymers with the coumaran units A have a deflection temperature (heat distortion point) that is about 30° to 50° C. higher, and as plastics with lower water absorption that are hydrolytically stable they offer significant advantages when used as materials of construction in engineering applications, as, for example, in the electronics industry and in aircraft manufacture. Depending on the structural makeup, the glass-transition temperatures Tg of the novel polyethers of the invention range from about 150° to 300° C., and more particularly from 180° to 280° C., and preferably from 200° to 260° C. The novel polymers are amorphous and can readily be processed further from solutions.

One advantage of the novel polymers is that the coumaran unit A, introduced in particular through the corresponding 3,8dihydroxy compound, is readily obtained from benzaldehyde by way of benzil and its reaction with resorcinol, in other words, from inexpensive starting materials and by simple operating procedures.

For the production of the novel aromatic polyethers (1) with the aromatic basic units A, B and C by polycondensation, bifunctional chemical units A', B' and C' are essentially used which differ from the basic units A, B and C in that each has two additional functional groups. The reactive compounds used are, in particular, compounds with halogen, and preferably fluorine and chlorine, and compounds with phenolic hydroxyl groups, which are preferably reacted as phenolates. Suitable bifunctional starting compounds are, in addition to dihalogen compounds and bisphenols, as described earlier as type (I) and type (II) compounds, compounds which contain both a halogen group and a phenolic group in the same molecule.

The compounds A', B' and C' are used in such a ratio to one another that the halogen and OH groups reacting with each other are equivalent. The inventive polycondensates will then have a reduced viscosity of over 0.25 dl/g, as measured in chloroform in conformitY with DIN 7745, part 2, corresponding to ISO 1628/6, and hence plastiCs properties.

The polycondensation conditions to be used in the production of the novel aromatic polyethers are comparable to those used in the production of the phosphorus-containing polyarylene ethers described in U.S. Pat. No. 4,492,805 or in U.S. Pat. No. 4,175,175. This applies in particular to the use of appropriate reaction media and solvents, for example, xylenes or polar aprotic solvents such as N-methylpyrrolidone, dimethylformamide, N,N-dimethyl acetamide, dimethyl sulfoxide or sulfolane, the reaction temperatures of from 100° to 300° C., and the condensing agents, which are strongly basic alkali-metal compounds, and in particular sodium carbonate or potassium carbonate, or alkali-metal hydroxides such as KOH or NaOH in an amount approximately equivalent to the amount of halide to be split off. Under these conditions, reaction times ranging from 30 minutes to about 50 hours will be required to produce the polymers.

Further, the preparation of the aromatic polyethers of the invention can be advantageously carried out using further measures known for the preparation of aromatic polyethers, such as the addition of small amounts of Cu(I)- or Cu(II)-compounds such as as Cu$_2$O or copper-II-acetate, and/or the addition of alkali metal salts such as KF or alkali metal salts of organic acids (cf. Journal of Polymer Science: Part C, No. 16, pp. 715–724 [1967]; EP-A 0,244,167.) In this way, an acceleration of the polycondenation and/or a lowering of the polycondensation temperature is achieved.

The presence of copper compounds and/or alkali metal salts such as KF acts as an accelerator for the reaction to obtain polydeondensates having relatively high molecular weight, i.e. polycondensates with synthetic resin properties, not only in the preparation of polyethers according to the invention which contain "coumaran" units A, but also in the preparation of polyethers free of such "coumaran" units A, such as are obtained, for example, in the polycondensation of 4,4'-difluorobenzophenone and 9,9-bis(4'-hydroxyphenyl)-fluorene (cf. German patent application P 37 25 058.2). The polycondensation in the presence of copper compounds and/or alkali metal salts such as kF is particularly advantageous when less reactive starting compounds, such as when 4,4'-dichlorobenzophenone, are used.

A starting compound A' for introduction of the coumaran unit A into the inventive polyethers that has proved itself is 3,8-dihydroxy-5a,10b-diphenyl-coumarano[2',3':2,3]coumaran, which can be prepared from benzil and resorcinol, as described in Rec. Trav. Chim. Pays-Bas 1986, 87 (6), 599–608.

The starting compounds B' used to introduce the B unit into the polycondensate (1) are compounds of the formula

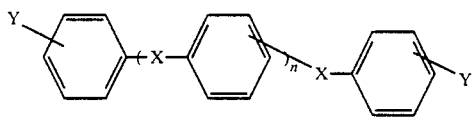

wherein n is 0 or 1, X is SO$_2$ or CO, and Y is halogen, and particularly F or Cl, or OH, such as 4,4'-difluorodiphenyl sulfone, 4,4'-dichlorodiphenyl sulfone, 4,4'-dihydroxydiphenyl sulfone, 4-chloro-4'-hydroxydiphenyl sulfone, 4,4'-difluorobenzophenone, 4,4'-dichlorobenzophenone, 4,4'-dihydroxybenzophenone, 4-chloro-4'-hydroxybenzophenone, 4,4'-difluoroterephthalophenone and/or 4,4'-difluoroisophthalophenone.

The functional halogen or hydroxyl groups are preferably in the 4,4 position. However, other position isomers may also be present, in minor amounts, in the starting compounds B.

In addition to the compounds named above, phosphoruscontaining compounds may be used as starting compounds B' in the production of the polyether. In these compounds, the functional groups are preferably in a position para to the carbon atom attached to the phosphorus atom. Illustrative of preferred phosphoruscontaining compounds B' are 4,4'-dichlorotriphenylphosphine oxide, 4,4'-dichlorodiphenylmethylphosphine oxide, 4,4'-difluorotriphenylphosphine oxide and 4,4'-difluorodiphenylmethylphosphine oxide.

Examples of starting compounds C' for incorporation of C in the polyether are hydroquinone, 4,4'-dihydroxydiphenyl, 4,4'-dihydroxydiphenyl ether, 2,2-bis(4-hydroxyphenyl)propane or bifunctional cardo compounds such as 9,9-bis(4-hydroxyphenyl)fluorene.

However, the novel polyethers may, if desired, also have branched structures, as described in U.S. Pat. No. 4,696,993 in connection with phosphorus-containing polyarylene ethers. Suitable starting compounds C' for introduction of branching points into the polyether are the compounds tris(4-fluorophenyl)phosphine oxide, tris(4-hydroxyphenyl)phosphine oxide, 1,3,5-tris(4'-hydroxyphenyl)benzene and 1,4-bis(4',4''-dihydroxytriphenylmethyl)benzene, for example, and optionally also aliphatic polyhydroxy compounds such as pentaerythritol, for example.

A better understanding of the present invention and of its many advantages will be had from the following specific Examples, given by way of illustration.

EXAMPLES

Example 1

Synthesis of a polyether from 4,4'-difluorobenzophenone (I), bis-phenol A (II) and dihydroxy-5a,10b-diphenylcoumarano[2',3':2,3]-coumaran (II) in a molar ratio of I:II:III=4:1:3.

In a 6-liter four-neck flask equipped with stirrer, internal thermometer, nitrogen inlet and a water separator with a reflux condenser set thereon, 85.6 g (0.375 mol) of bisphenol A, 443.7 g (1.125 mols) of the coumaran derivative (3), 327.3 g (1.5 mols) of 4,4'-difluorobenzophenone, 219.7 g of potassium carbonate, 2.25 liters of N-methylpyrrolidone and 0.7 liter of a technical xylene mixture were introduced as initial charge. The reaction mixture was then heated with an oil bath under a nitrogen atmosphere to reflux temperature and the water formed was azeotroped off within 2 hours. After complete removal of the water, the xylene was distilled off by means of the water separator at about 180° C. and the residual reaction mixture was held at that temperature until the weight-average molecular weight of the polycondensate was about 80,000 (as determined by gel permeation chromatography, standardized with polystyrene). Then about 0.2 mol of methyl chloride was passed through the reaction mixture.

After cooling, the mixture was diluted with 500 ml of N-methylpyrrolidone and filtered by suction from the solid constituents of the reaction mixture. The polyether was then precipitated in seven times as much water/ethanol (volume ratio, 7:3), separated from the liquid by filtration, and after being dried for 18 hours at room temperature dissolved in as little methylene chloride as possible. The solution was added dropwise to five times its volume of ethanol, with the polycondensate precipitating. The product was dried in a vacuum at 140° C. to constant weight. Yield: 701 g (88% of theory).

The analysis was performed by means of $C^{13}$ N spectroscopy.

Production parts obtained by thermoplastic processes (extrusion) were found to have the following properties:

| $M_w$ | Elongation at break[1] % | Modulus of elasticity MPa | Tensile strength MPa | UL94 rating[3] | Smoke density[4] (1.5/4 min.) | Glass transition temp.[5] °C. | Water absorption[6] (23° C.) % |
|---|---|---|---|---|---|---|---|
| 96,000 | 38 | 2,750 | 81 | V-0 | 2/19 | ca. 235 | 0.76 |

[1]Gel permeation chromatography; standardization with polystyrene.
[2]DIN 53,455.
[3]Underwriters Laboratories test; V-0 is the best rating.
[4]Smoke chamber meeting the requirements of the National Bureau of Standards.
[5]Differential scanning calorimetry. (See E. A. Turi, ed., "Thermal Characterization of Polymeric Materials", p. 169, Academic Press, New York 1981.)
[6]DIN 53,495.

Examples 2 and 3

The reaction was carried out as described in Example 1, except that the molar ratio of bisphenol A to coumaran derivative was 3:1 and 1:1, respectively.

Plastics having the following properties were obtained:

| Example | Molar ratio B.A:C | Elongation at break % | Modulus of elasticity MPa | Tensile strength MPa | UL94 rating | Smoke density (1.5/4 min.) | Glass transition temp. °C. | Water absorption (23° C.) % |
|---|---|---|---|---|---|---|---|---|
| 2 | 3:1 | 65 | 2,770 | 72 | V-1 | 3/41 | | |
| 3 | 1:1 | | | | V-0 | 1/13 | 223 | 0.6 |

Example 4

The reaction was carried out as described in Example 1, except that only dihydroxy-5a,10b-diphenyl-coumarano[2',3':2,3]-coumaran was used as bisphenol. The plastic had the following properties:

| Elongation at break % | Modulus of elasticity MPa | Tensile strength MPa | UL94 rating | Smoke density (1.5/4 min.) | Glass-transition temperature °C. | Water absorption (23° C.) % |
|---|---|---|---|---|---|---|
| 9.2 | 2,490 | 82.8 | V-0 | 1/7 | 274 | 0.88 |

Examples 5 to 6

The reaction was carried out as described in Example 1, except that in place of 4,4'-difluorobenzophenone, 4,4'-dichlorodiphenyl sulfone was used (in the same molar quantity) and that the quantities used were reduced by a factor of 5. The reactions were therefore run in a 2-liter round-bottom flask. The reaction times remained as described in Example 1.

| Example | Glass-transition temperature* °C. | Molar ratio bisphenol A to coumaran bisphenol |
|---|---|---|
| 5 | 199 | 7:3 |
| 6 | 218 | 1:1 |

*Determined by differential scanning calorimetry (DSC).

Examples 7 to 10

The reaction was carried out as described in Example 5, except that in place of bisphenol A other bisphenols were used. The polyethers were obtained from 4,4'-dichlorodiphenyl sulfone, coumaran bisphenol and bisphenol, used in a molar ratio of 2:1:1.

| Example | Bisphenol | Glass-transition temperature °C. |
|---|---|---|
| 7 | 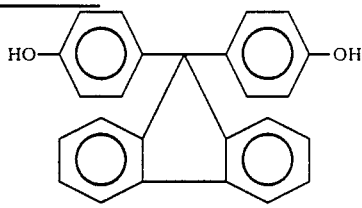 | 278 |
| 8 | 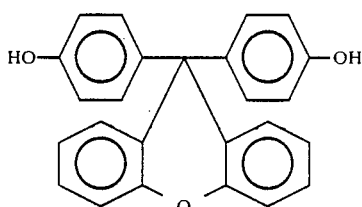 | 248 |
| 9 | 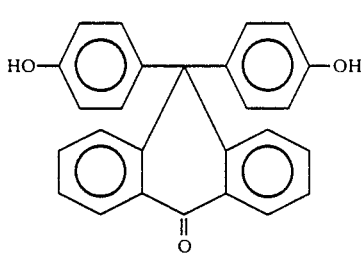 | 268 |

| Example | Bisphenol | Glass-transition temperature °C. |
|---|---|---|
| 10 | 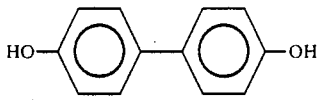 | 245 |

Examples 11 to 14

The same procedure was followed as in Example 7, except that in place of 4,4'-dichlorodiphenyl sulfone, 4,4'-difluorotriphenylphosphine oxide was used.

| Example | Bisphenol | Glass-transition temperature °C. |
|---|---|---|
| 11 | 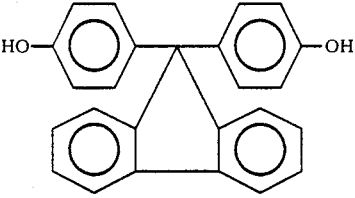 | 268 |
| 12 | 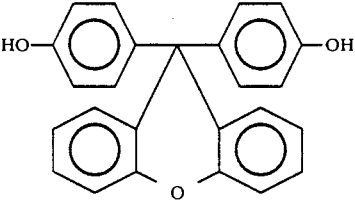 | 235 |
| 13 | 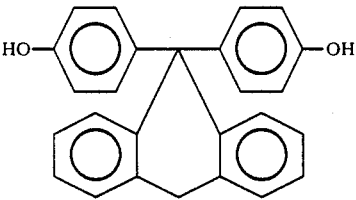 | 276 |
| 14 | 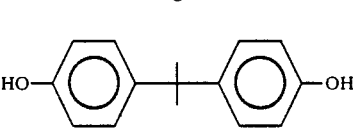 | 238 |

Examples 15 and 16

The reaction was carried out as described in Example 5, except that in place of 4,4'-difluorobenzophenone 4,4'-difluoroisophthalophenone and/or 4,4'-difluoroterephthalophenone were used. The molar ratio of bisphenol A to coumaran derivative as 1:1. Products having the following properties were obtained:

| Example | Reactive dihalide used | Glass-transition temperature °C. |
|---|---|---|
| 15 | 4,4'-difluoroterephthalophenone | 199 |
| 16 | 4,4'-difluoroisophthalophenone | 182 |

Breakdown of viscosity, determined in chloroform as solvent (as reduced viscosity in conformity with DIN 7745, part 2, corresponding to ISO 1628/6), of the polycondensates obtained.

| Example | Reduced viscosity dl/g |
|---|---|
| 1 | |
| 2 | |
| 3 | |
| 4 | 0.39 |
| 5 | 0.43 |
| 6 | 0.32 |
| 7 | 0.34 |
| 8 | 0.29 |
| 9 | 0.26 |
| 10 | 0.70 |
| 11 | 0.30 |
| 12 | 0.28 |
| 13 | 0.30 |
| 14 | 0.42 |
| 15 | 0.29 |
| 16 | 0.34 |

Examples 17–25

Example 17 Synthesis of a Polyether from 4,4'-dichlorobenzophenone (I), bisphenol A (II), and dihydroxy-5a,10b-diphenyl-coumarano-2',3',2,3-coumaran (III) in a mol ratio I:II:III=4:1:3

2.85 g (0.0125 mol) of bisphenol A (II), 14.8 g (0.0375 mol) of the coumaran compound (III), 12.55 g (0.05 mol) of 4,4'-dichlorobenzophenone (I), 11.05 g (0.08 mol) of potassium carbonate, 0.1 g of copper-(I)-acetate, 0.4 g of potassium fluoride, 75 ml of N-methylpyrrolidone, and 45 ml of o-xylene were introduced into a 250 ml flask equipped with stirrer, interior thermometer, nitrogen inlet, and a water separator.

The reaction mixture was now heated under a nitrogen atmosphere to the reflux temperature with an oil bath and the water which formed was circulated out over a period of 2.5 hours. After complete removal of the water, the xylene was distilled off over the water separator at about 180° C. to 190° C. and the remaining reaction mixture was held at this temperature for 5 hours.

After cooling, the batch was diluted with 50 ml of N-methylpyrrolidone and filtered off from the solid components of the reaction mixture. The polyether was subsequently precipitated in 1.4 liters of ethanol/water (volume ratio=1:1), separated from the liquid by filtration, and, after drying for 18 hours at 150° C. in a vacuum drying cabinet, was dissolved in 300 ml of dichloromethane and precipitated in 1.6 liters of ethanol. The polycondensate was filtered off and dried to constant weight at 150° C. in vacuum. Yield: 24 g (91% of theory). The molecular weight of the polycondensate was about 61,000 (measurement: GPC; calibration with polystyrene).

Example 18

The reaction was carried out as in Example 17 except that no potassium fluoride was added. A polycondensate having a molecular weight of about 33,000 was obtained. The yield was 24.3 g (92% of theory).

Example 19

The reaction was carried out as in Example 17 except that no copper-(I)-acetate was added. A polycondensate having a molecular weight of about 9000 was obtained. The yield was 23.5 g (88% of theory).

Example 20 Synthesis of a Polyether from 4,4'-difluorobenzohenone (I), bisphenol A (II), and 9,9-bis(4'-hydroxyphenyl)fluorene (III) in a mol ratio I:II:III = 10:4:6

4.57 g (0.02 mol) of bisphenol A (II), 10.62 g (0.03 mol) of 9,9-bis(4'-hydroxyphenyl)fluorene (III), 10.91 g (0.05 mol) of 4,4'-difluorobenzophenone (I), 11.05 g (0.08) mol of potassium carbonate, 0.1 g of copper-(I)-acetate, and 50 ml of N-methylpyrrolidone were introduced into a 250 ml flask equipped with stirrer, interior thermometer, nitrogen inlet, and a column head having a reflux condenser thereon.

The reaction mixture was now heated under a nitrogen atmosphere with an oil bath to about 180° C. The water formed was drawn off over the column head during the reaction time of 1 hour and 20 minutes. The remaining reaction mixture was cooled, diluted with 100 ml of N-methylpyrrolidone, and filtered off from the solid components of the reaction mixture. The polyether was subsequently precipitated in 1.4 liters of ethanol/water (volume ratio: 1:1), separated from the liquid by filtration, and, after drying for 18 hours at 150° C. in a vacuum drying cabinet, dissolved in 350 ml of dichloromethane and precipitated in 1.6 liters of ethanol. The polycondensate was filtered off and dried to constant weight in vacuum at 150° C. Yield: 21.5 g (90% of theory). The molecular weight of the polycondensate was about 121,000 (measurement: GPC, calibration with polystyrene).

Example 21

The reaction was carried out as in Example 20 with the exception that copper-(II)-acetate was used instead of copper-(I)-acetate. A polycondensate having a molecular weight of about 118,000 was obtained. The yield was 18.1 g (76% of theory).

Example 22

The reaction was carried out as in Example 20 except that no copper compound was added. A polycondensate having a molecular weight of about 30,000 was obtained. The yield was 21 g (88% of theory).

Example 23

The reaction was carried out as in Example 20 with the exception that the reaction mixtures was heated only to a temperature of 150° C. to 160° C. After a reaction time of 4 hours, a polycondensate having a molecular weight of about 155,000 was obtained. The yield was 21.1 g (88% of theory).

Example 24

The reaction was carried out as in Example 20 with the exception that the reaction mixture was heated only to a temperature of 130° C. to 140° C. After a reaction time of 10 hours, a polycondensate having a molecular weight of about 55,000 was obtained. The yield was 21 g (88% of theory).

Example 25

The reaction was carried out as in Example 20 with the exception that dimethylacetamide was used as the solvent. The reaction temperature was 150° C.–160° C. and the reaction time was 10 hours. A polycondensate having a molecular weight of about 70,000 was obtained. The yield was 21.6 g (90% of theory).

What is claimed is:

1. An aromatic polyether, resistant to high temperature, having a reduced viscosity greater than 0.25 dl/g and consisting essentially of the repeating structural unit

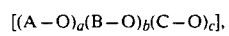

wherein A, B and C are ether-linked in uniform or statistical order, and wherein A is 5a,10b-diphenylcoumarano[2',3',2,3]coumaran of the formula

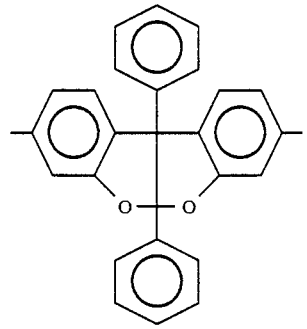

linked in the 3- and 8- positions, B has the formula

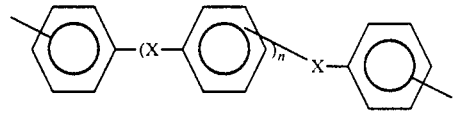

wherein n is 0 or 1 and X is at least one member selected from the group consisting of =CO and =SO$_2$, and C is at least one further aromatic unit free of phosphine oxide groups, wherein the molar ratios of the groups A, B, and C are such that (a+c):b=1:1 to 1:100 and a:c=100.0 to 1:99.

2. An aromatic polyether as in claim 1 wherein the molar ratio (a+c):b=1:1.

3. An aromatic polyether as in claim 2 wherein B is 4,4'-benzophenone, C is 2,2-bis(1,4-phenylen)propane, the molar ratio (a+c):b=1:1, and a:c=30:70 to 100.0.

4. An aromatic polyether as in claim 1 wherein B is 4,4'-benzophenone, C is 2,2-bis(1,4-phenylene)propane, the molar ratio (a+c):b=1:1, and a:c=30:70 to 100:0.

* * * * *